(12) United States Patent
Yeh

(10) Patent No.: US 6,837,410 B1
(45) Date of Patent: Jan. 4, 2005

(54) AUTOMATIC PICTURE TUBE CUTTING MACHINE

(76) Inventor: Neng-Kuei Yeh, No. 10, Lane 715, Ta Tung Street, Yung Kang, Tainan Hsien (TW)

( * ) Notice: Subject to any disclaimer, the term of this patent is extended or adjusted under 35 U.S.C. 154(b) by 0 days.

(21) Appl. No.: 09/552,665

(22) Filed: Apr. 19, 2000

(51) Int. Cl.[7] .......................... C03B 33/095; H01J 9/50
(52) U.S. Cl. ........................ 225/93.5; 225/96; 269/908; 445/2; 445/61
(58) Field of Search ........................ 225/2, 93.5, 94, 225/96, 97; 65/174, DIG. 4; 269/315, 320, 908; 445/2, 61

(56) References Cited

U.S. PATENT DOCUMENTS

| | | | | |
|---|---|---|---|---|
| 3,012,330 A | * | 12/1961 | Mendham | 269/315 X |
| 4,391,423 A | * | 7/1983 | Pruett et al. | 244/161 |
| 5,045,009 A | * | 9/1991 | Cordingley et al. | 83/452 X |
| 5,252,113 A | * | 10/1993 | Jung et al. | 225/93.5 X |
| 5,383,948 A | * | 1/1995 | Muir | 269/908 X |
| 5,439,406 A | * | 8/1995 | Fuwa et al. | 445/2 |
| 5,556,018 A | * | 9/1996 | Kanehira | 225/93.5 X |
| 5,769,296 A | * | 6/1998 | Kanehira | 225/93.5 |
| 5,772,093 A | * | 6/1998 | Kanehira | 225/93.5 X |
| 6,089,433 A | * | 7/2000 | Kanehira | 225/93.5 X |
| 6,089,937 A | * | 7/2000 | Shoji et al. | 445/2 |
| 6,108,924 A | * | 8/2000 | Jang et al. | 33/552 |

FOREIGN PATENT DOCUMENTS

| | | | |
|---|---|---|---|
| DE | 43 13 157 | * | 2/1994 |
| DE | 42 29 684 | * | 3/1994 |
| DE | 43 30 230 | * | 3/1995 |
| EP | 0 593 143 | * | 4/1994 |

* cited by examiner

*Primary Examiner*—Clark F. Dexter
(74) *Attorney, Agent, or Firm*—Rosenberg, Klein & Lee

(57) ABSTRACT

An automatic picture tube cutting machine is provided. The machine includes a transporting mechanism for transporting a tray carrying a picture tube into a moving-up-and-down base, which automatically adjusts the vertical position of the picture tube based upon its size. The machine also includes a positioning and cutting device wherein a plurality of clamp units cooperatively set tungsten heating filaments in contact with the picture tube to circumscribe that picture tube at a preset cutting height. Upon heating via the tungsten heating filaments and subsequent cool water quenching, the picture tube is broken at its circumscribed portion into separated front and rear stages.

7 Claims, 16 Drawing Sheets

AUTOMATIC PICTURE TUBE CUTTING MACHINE

BACKGROUND OF THE INVENTION

This invention relates to an automatic picture tube cutting machine, particularly to one automatically feeding material, measuring the size of a picture tube, positioning and cutting the picture tube.

Nowadays, televisions have been widely used in homes, and a large number of them are discarded. Then it is very important to recycle luminescent powder painted in a picture tube, as luminescent powder is a material leading to grow cancer in a human body. Therefore, if it is not properly treated, it pollutes the environment to bring danger to people's health.

In treating old picture tubes of televisions and computers, a front stage containing barium glass is first to be cut off a rear stage of lead glass, and then luminescent powder painted on an inner surface of the glass is sucked off by means of vacuum process, and then collected to be sealed in a container. Then it is sent to a qualified waste treatment factory to be hardened. However, cutting picture tubes has been performed manually so far.

A conventional picture tube cutting machine has old discarded picture tubes manually carried and placed on a work table of the machine, and adjusting the correct position of a picture tube for a worker to wind tungsten filament around the jointed point of the front and the rear stage of a picture tube, with tungsten filament tightly pulled and secured its one end with a clamp, and then the tungsten filament is powered to heat up the glass of a picture tube for a certain period of time (about 2–3 minutes), making the glass inflate because of heating by the tungsten, and then spraying cool water to instantly cool and let the glass where wound with the tungsten filament break. Then the tungsten filament is removed and the rear stage lead glass is stowed away. After that a metal net inside the front stage glass is taken out and the luminescent powder painted on an inner wall of the glass is removed off by means of vacuum process and stored in a container. The front stage glass with luminescent powder completely removed is stowed away for future final treatment.

Manual cutting process of picture tubes just described has the following disadvantages.

1. Placing a picture tube on the work table is done completely by manual labor, it takes much time and work, especially in case of a heavy one, chances are that a picture tube may be broken by colliding with something hard carelessly, causing danger to workers.
2. As picture tubes have various sizes, tungsten filament may have to be long enough for winding, and in addition, heating and cooling time may be different. So a worker should have some experience, or work efficiency may be low. And experienced workers may have to be paid high wages.

SUMMARY OF THE INVENTION

A first objective of the invention is to offer an automatic picture tube cutting machine, which includes a transporting tray for placing a picture tube on and a transporting machine to transport the tray in a moving-up-and down base. Then the base automatically moves up and adjusts the height of the picture tube to send it in a positioning and cutting device to let the picture tube to stay at a correct position for cutting, correcting the center point of the picture tube on the transporting tray by a clamp unit, letting the tungsten filaments of the cutting device closely contact the four sides of the picture tube. Then the tungsten filaments are electrified to heat up the picture tube for a set time and cool water is sprayed on the same tube with nozzles to cool the glass to break to cut off separately the front stage from the rear stage of the picture tube. After that the moving-up-and-down table is lowered down to send out the cut picture-tube, finishing cutting work.

Another objective of the invention is to offer an automatic picture tube cutting machine, which has a speed recorder to be touched by the transporting tray when the transporting tray is moved in the moving-up-and-down base. When the front stage of a picture tube passes a photoelectric sensor respectively located at two sides of the transporting machine, a PLC (programmable logic controller) controller begins to record until the whole picture tube completely passes through the photoelectric sensors, which may then stop. Thus, the moving-up-and-down base lifts up the picture tube to the needed height, in accordance to the distance and the size of the picture tube calculated by the speed recorder.

Another objective of the invention is to offer an automatic picture tube cutting machine having a recessed frame fitted in the center portion of the transporting tray so that the curved screen of the picture tube may just contact the upper circumferential edge of the recessed frame, at the same time permitting the cutting device to easily move the picture tube to correct its center point.

One more objective of the invention is to offer an automatic picture tube cutting machine, wherein the tungsten filaments at two sides of the clamp rods of the cutting device is respectively connected with a spring to enable the tungsten filament to closely and elastically contact the four sides of the picture tube. Then even if the tungsten filaments should be shortened to the shortest, the tungsten filament could cope with various size of a picture tube to be cut, making the most of the tungsten filaments.

BRIEF DESCRIPTION OF DRAWINGS

This invention will be better understood by referring to the accompanying drawings, wherein.

DETAILED DESCRIPTION OF THE PREFERRED EMBODIMENT

Figure 1:
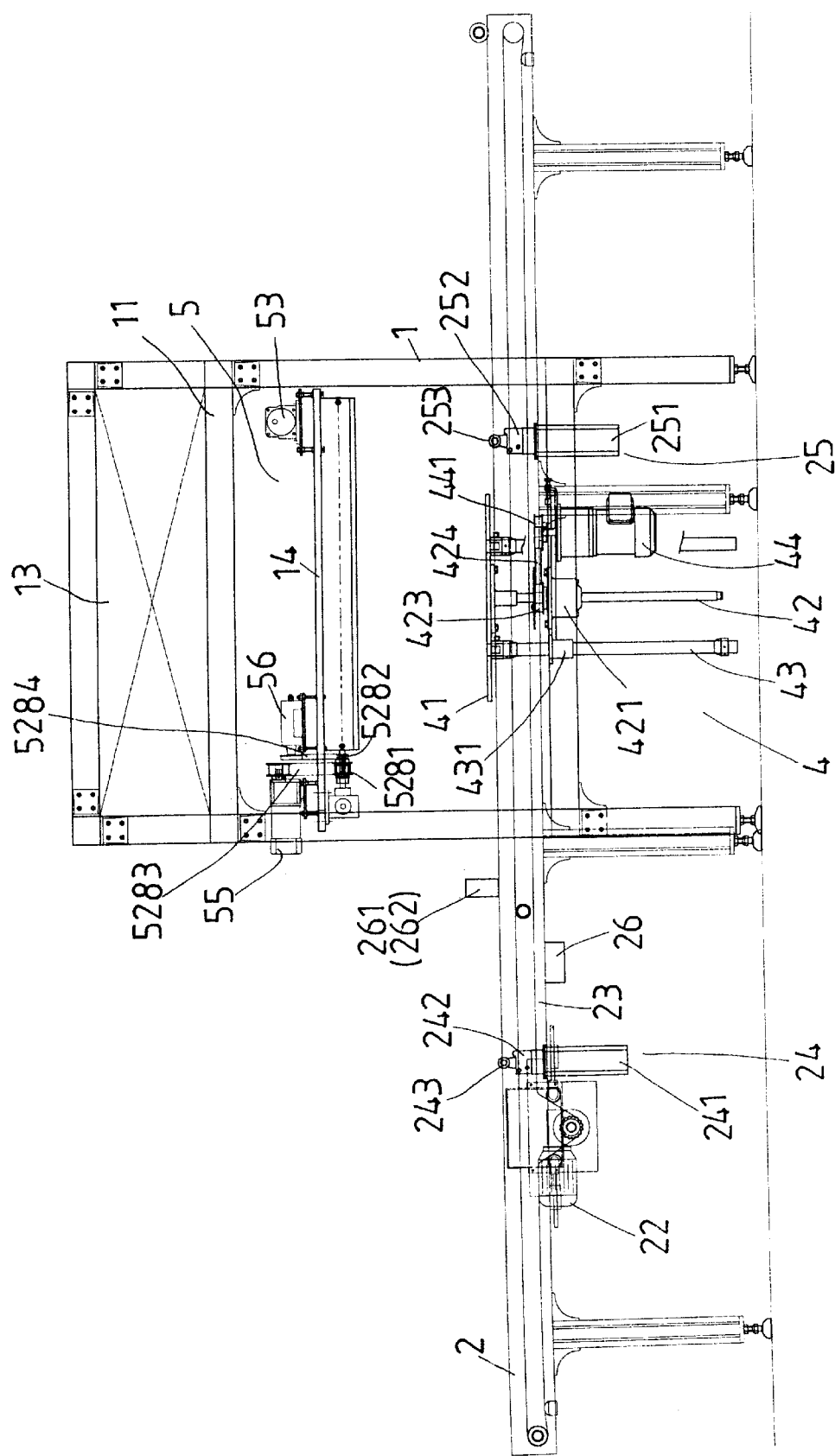
FIG. 1 is a front view of an automatic picture tube cutting machine.
Figure 2:
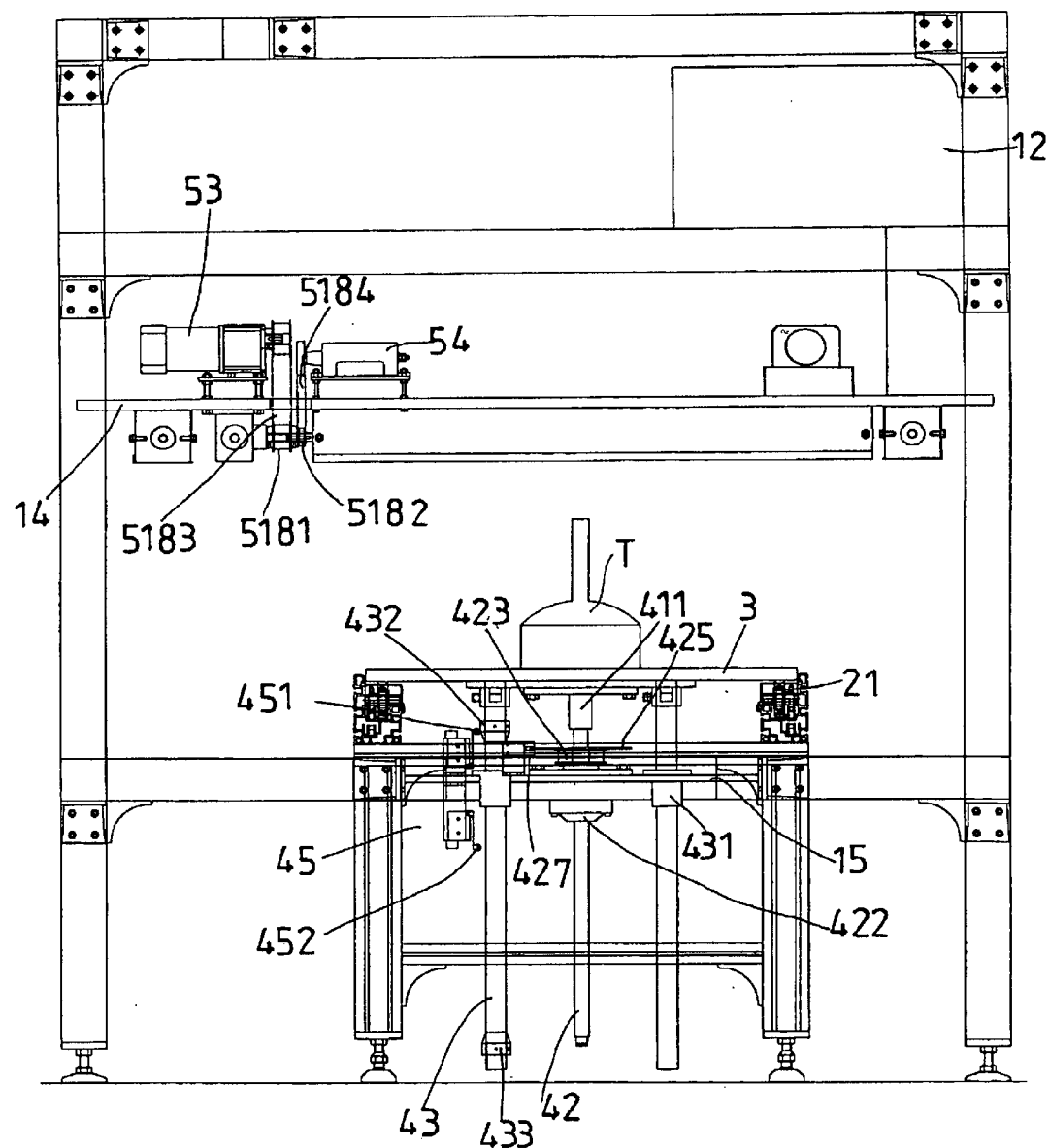
FIG. 2 is a left side view of FIG. 1.
Figure 3:
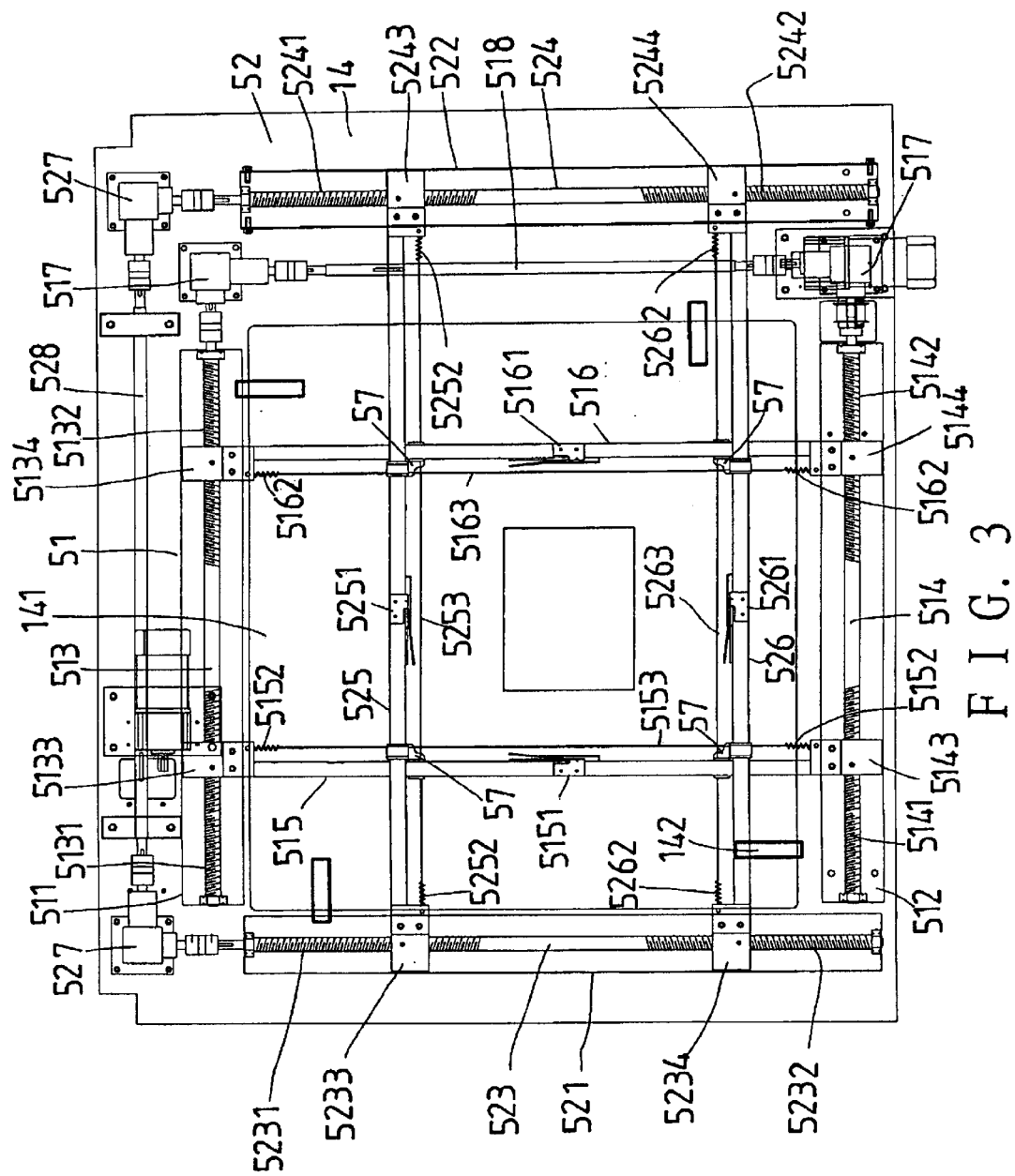
FIG. 3 is an upper view of FIG. 1.

A preferred embodiment of an automatic picture tube cutting machine in the present invention, as shown in FIGS. 1, 2 and 3, includes a machine frame 1, a transporting machine 2, a transporting tray 3, a moving-up-and-down base 4 and a positioning and cutting device 5 as main components combined together.

The machine frame 1 has a preset height, a lateral rod 11, a water tank 12 and a controller 13 placed on the lateral rod 11, an upper flat plate 14 and a lower flat plate 15 below the lateral rod 11, the positioning and cutting device 5 fixed on the upper flat plate 14, the moving-up-and-down base 4 fixed on the lower flat plate 15. The upper flat plate 14 has a center hole 141 for a moving-up-and-down plate 41 of the moving-up-and-down base 4 with a picture tube placed on the plate 41 to move up therein, a plurality of nozzles 142 are positioned on a circumferential edge, connected to the water tank 12. The transporting machine 2 moves back and forth through a lower portion of the machine frame 1.

The transporting machine 2 is installed in a lower portion of the machine frame 1, moving between the moving-up-and-down base 4 and the positioning and cutting device 5, having plural rollers 21 spaced apart equidistantly at two sides, and the transporting tray 3 placed on the rollers 21. Each roller 21 engages and rotates with a chain 23, which is pulled to move by a power source 22. When the rollers 21 rotate, the transporting tray 3 is moved forward. Further, a first stop unit 24 and a second stop unit 25 are respectively fixed at an intermediate portion of the transporting machine 2 and the exit of the moving-up-and-down base 4. A first air pressure cylinder 241 and a second air pressure cylinder 251 are fixed on a frame of the transporting machine 2, respectively having a piston rod extending up and fixed with a stop block 242, 252 having a micro switch 243, 253 on top. When the transporting tray 3 moves to touch the micro switches 243, 253, the air pressure cylinders 241, 251 operate to move the piston rods to push tip the stop blocks 242, 252 to stop the transporting 10 tray 3.

In addition, a speed recorder 26 is fixed below the transporting machine, and photoelectric switches 261, 262 are respectively fixed at two sides of an entrance of the moving-up-and-down base 4, connected with the speed recorder 26, which is also connected to a PLC controller and coder of the controller 13 to calculate the size of the picture tube passing the photoelectric switches 261,262.

Figure 4:
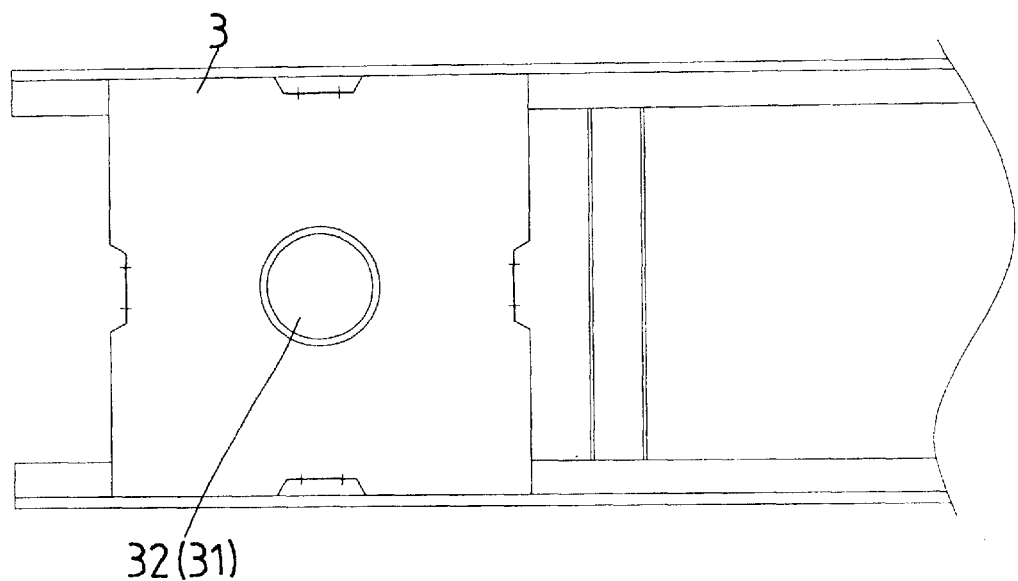
FIG. 4 is an upper view of a transporting tray of the present invention.
Figure 5:
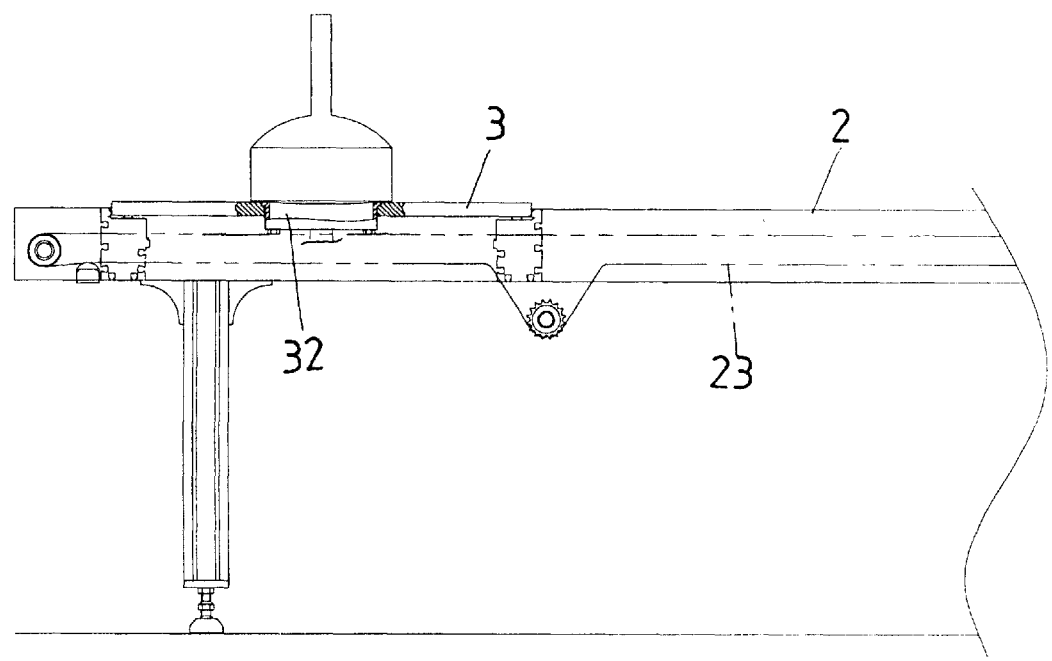
FIG. 5 is a side view of the transporting tray of the present invention.

The transporting tray 3, as shown in FIGS. 4 and 5, is sized just to locate between the rollers 21 at two sides of the transporting machine 2, having a recess 31 in the center for the recessed frame 32 to fit therein. Then the outer surface of the screen of a picture tube is fit to the upper circumferential edge of the recessed frame 32 and positioned securely so as not to sway. The transporting tray 3 may thus easily move the picture tube to correct its center point.

Figure 6:
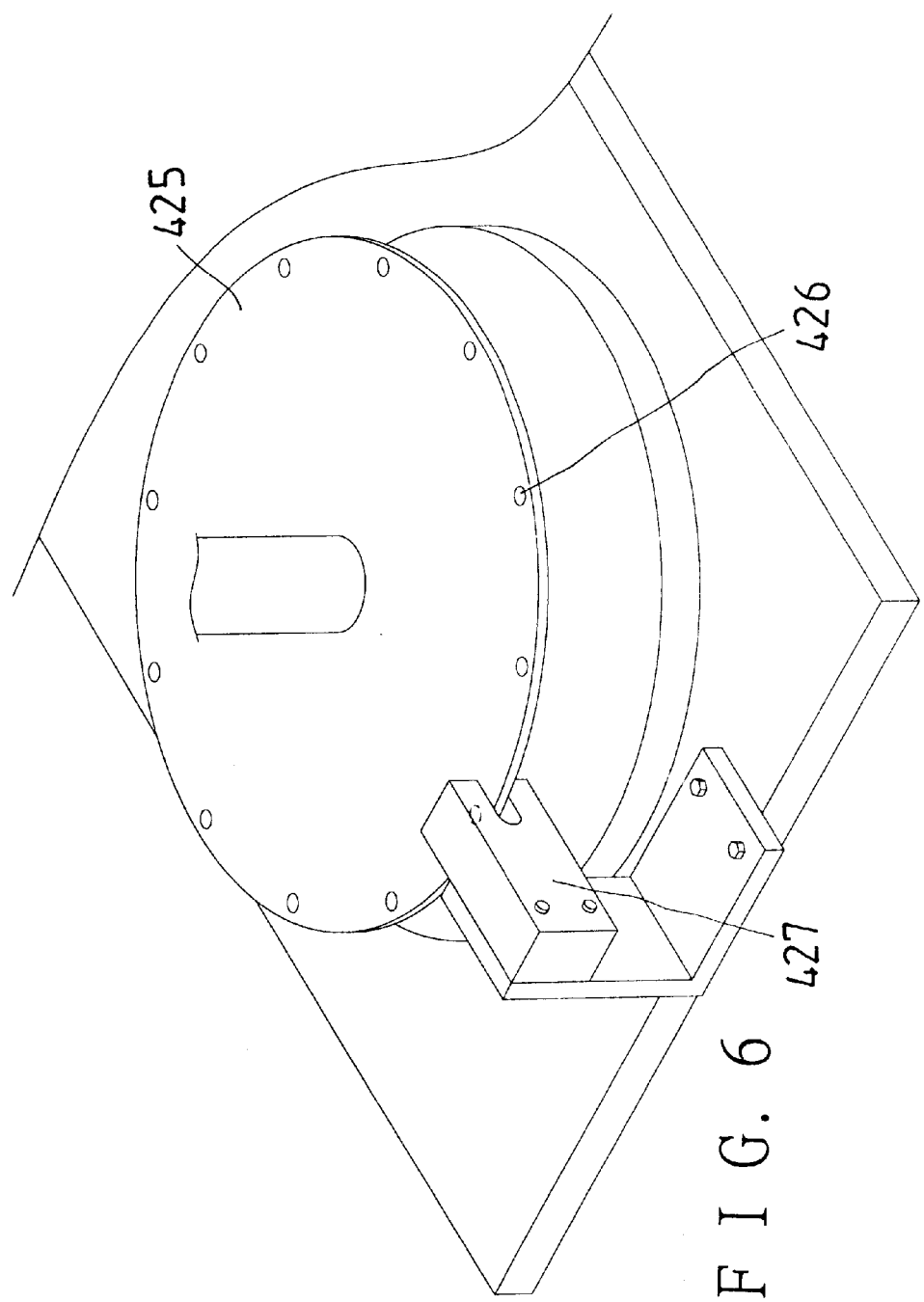
FIG. 6 is a part perspective view of a moving-up-and-down base of the present invention.

The moving-up-and-down base 4 is fixed on the lower flat plate 15, consisting of the moving-up-and-down plate 41, a bead threaded rod 42, plural guide rods 43, a power source 44 and a position limit switch 45. The transporting base 3 rests on the moving-up-and-down plate 41, a shaft sleeve 411 is fixed at the bottom of the moving-up-and-down plate 41 to fit around the bead threaded rod 42, and the four guide rods 43 extend down out of the four corners of the moving-up-and-down plate 41. The bead threaded rod 42 can screw with a screw sleeve 421 combined in a bearing unit 422 fixed on the lower flat plate 15, and at the same time a timing belt wheel 423 is placed on the threaded sleeve 421 to engage a timing belt 424 to connect with a transmitting timing belt wheel 441 of the power source 44 fixed at one side of the lower flat plate 15 to lift or lower the bead threaded rod 42 rotating in the threaded sleeve 421. Further, a rotating disc 425 is fixed on an upper surface of the timing belt wheel 423 as shown in FIG. 6, having a plurality of through holes 426. A magnetic sensor 427 fixed on the lower flat plate 15 at one side of the rotatable disc 425 extends about a portion of the rotatable disc 425 to sense the number of through holes 426 passing through the sensor 427 such that the vertical movement of the moving-up-and-down plate 41 to be lifted may be calculated.

Next, each guide rod 43 passes through a linear bearing 431 fixed on the lower flat plate 15, and then extends downward. One of the guide rods 43 has an upper end and a lower end fixed with an upper and a lower stop block 432 and 433, and an upper and a lower position limit switch 451 and 452 are respectively fixed on and under the lower flat plate 15. Thus, when the upper stop block 432 or the lower stop block 433 touches the upper limit switch 451 or the lower limit switch 452 during rising or descending of the moving-up-and-down plate 41, the upper position limit switch or lower position limit switch 452 immediately commands the machine to stop, preventing the moving-up-and-down plate 41 from rising too high or descending too low, and providing twofold protection of the device.

The positioning and cutting device 5 is disposed on the upper flat plate 14 of the machine frame 1, and includes inner and outer clamp units 51 and 52 respectively located at inner side and outer side positions. The inner clamp unit 51 has threaded rod bases 511, 512 at two sides for supporting threaded rods 513, 514, which respectively have two ends forming left and right threaded sections 5131, 5132, 5141, 5142 to engage respectively guide blocks 5133, 5134, 5143, 5144 on different sides. An inverted U-shaped position rod 515, 516 made of non-conductive bakelite is respectively fixed between two corresponding guide blocks 5133, 5143, 5134, 5144, having micro switches 5151, 5161 set at intermediate portions thereof and springs 5152, 5162 fixed at two ends of the corresponding inner walls to connect to heating tungsten filaments 5153, 5163 to permit the tungsten filaments to effectively lengthen or shorten.

Further, the two threaded rods 513, 514 each have an end connected to a cross turner 517, and between the two cross turners 517 extends a connect rod 518, such that the movements of the two threaded rods 513, 514 are coupled one to the other. The connect rod 518 has large and small timing belt wheels 5181, 5182 respectively engaging a power source 53 and a position means 54 fixed on the upper flat plate 14 with timing belts 5183, 5184 to move nearer or farther away from each other the two position rods 515, 516, and the position means 54 regulates the maximum position in expansion or contraction.

The outer clamp unit 52 has almost the same structure as the inner clamp unit 51, having threaded rod bases 521, 522 respectively at two sides, but located not in line with the threaded rod bases 511,512 of the inner clamp unit 51, and threaded rods 523, 524 supported respectively on the threaded rod bases 521, 522. The threaded rods 523, 524 have left and right threaded sections 5231, 5232, 5241, 5242 formed in two ends to engage respectively guide blocks 5233, 5234, 5243, 5244 on different sides. Position rods 525, 526 made of non-conductive bakelite are respectively fixed between two corresponding guide blocks 5233, 5234, 5243, 5244, permitting the two position rods 525, 526 to cross the position rods 515, 516 of the inner clamp unit 51 to form a rectangularly crossed configuration. Micro switches 5251, 5261 are respectively fixed at inner walls of intermediate portions of the two position rods 525, 526, and springs 5252, 5262 are respectively placed in the inner corresponding ends of the position rods 525, 526 to connect heating tungsten filaments 5253, 5263 to expand or contract. The two threaded rods 523, 524 each have an end connected to a cross turner 527, and between the two corresponding cross turners 527 is connected a connect rod 528 to permit the two threaded rods 523, 524 to be mutually connected to move synchronously. The connect rod 528 has large and small timing belt wheels 5281,5282 fixed on and engaged with a power source 55 and a position means 56 by means of timing belts 5283, 5284. Then the two position rods 525, 526 may move nearer or farther away from each other when the power source operates, and the position means 56 regulates the maximum position of expansion and contraction.

Figure 7:
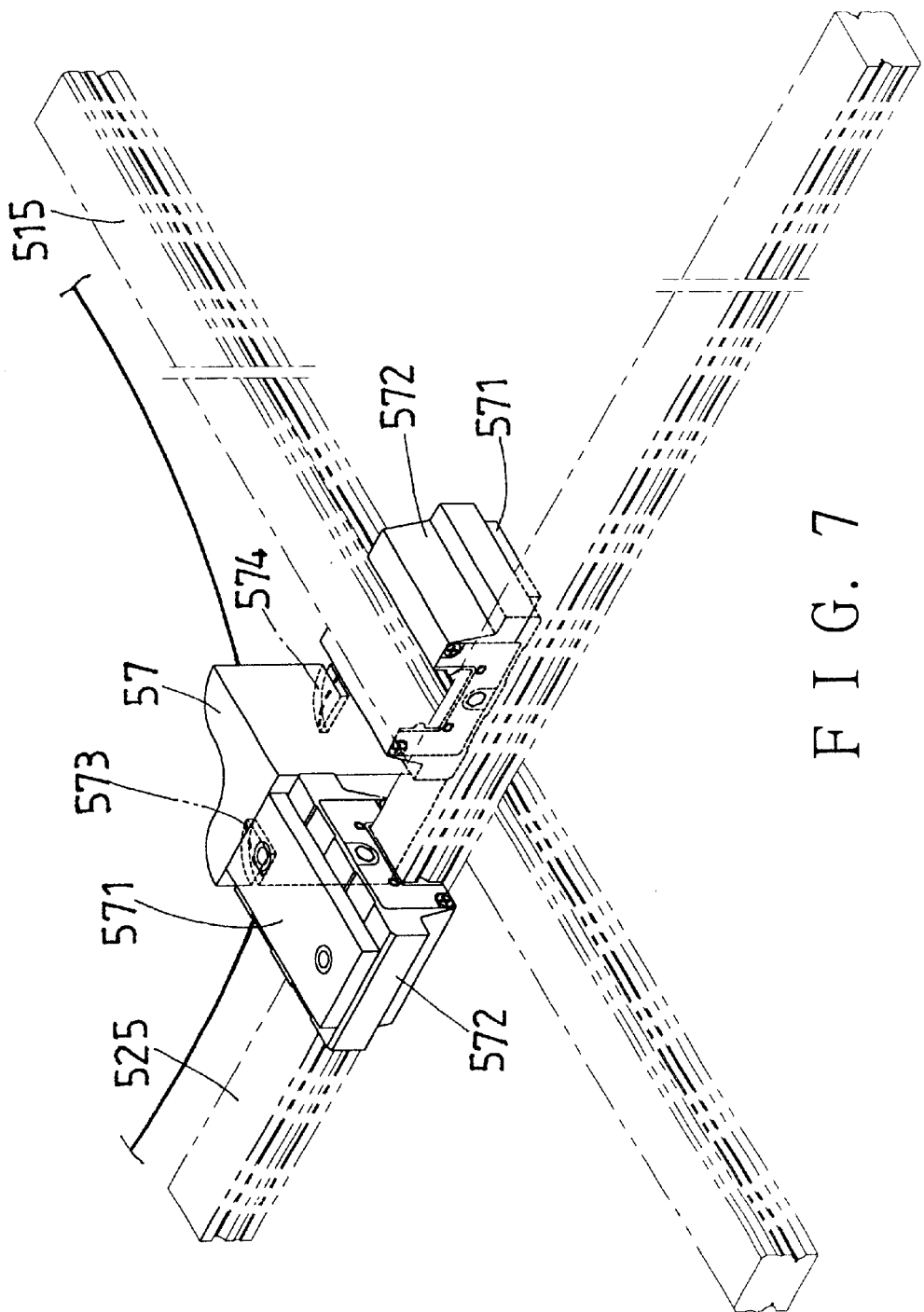
FIG. 7 is a perspective view of a position block of the present invention.
Figure 8:
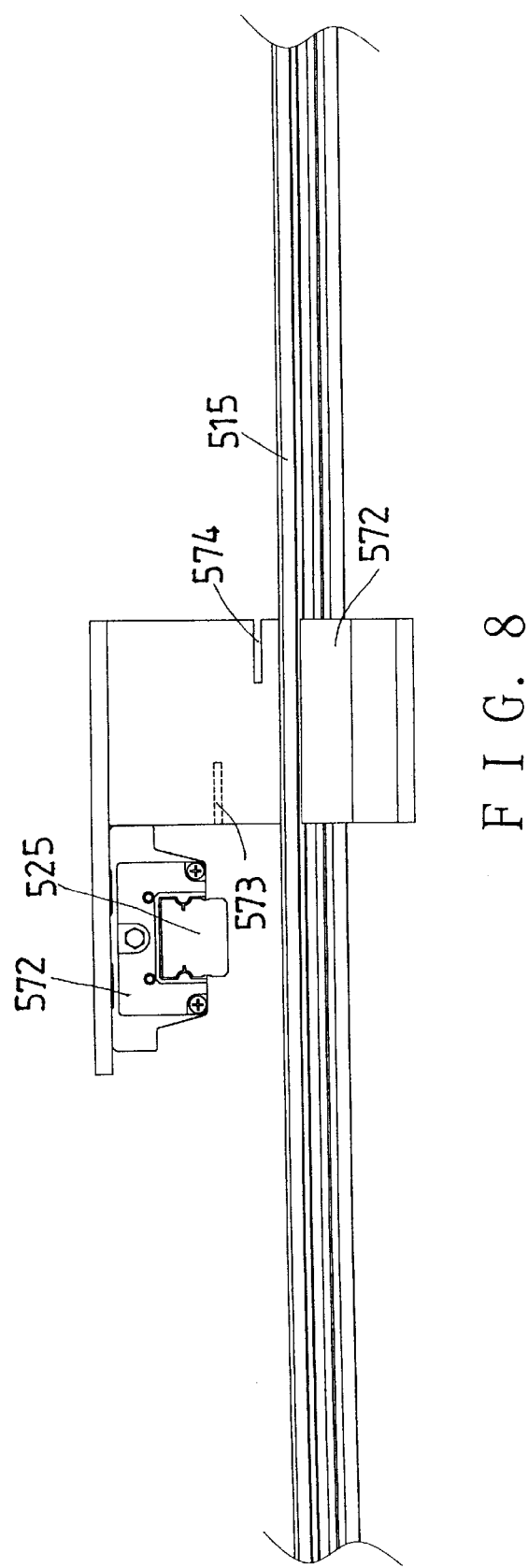
FIG. 8 is a side view of the position block of the present invention.
Figure 9:
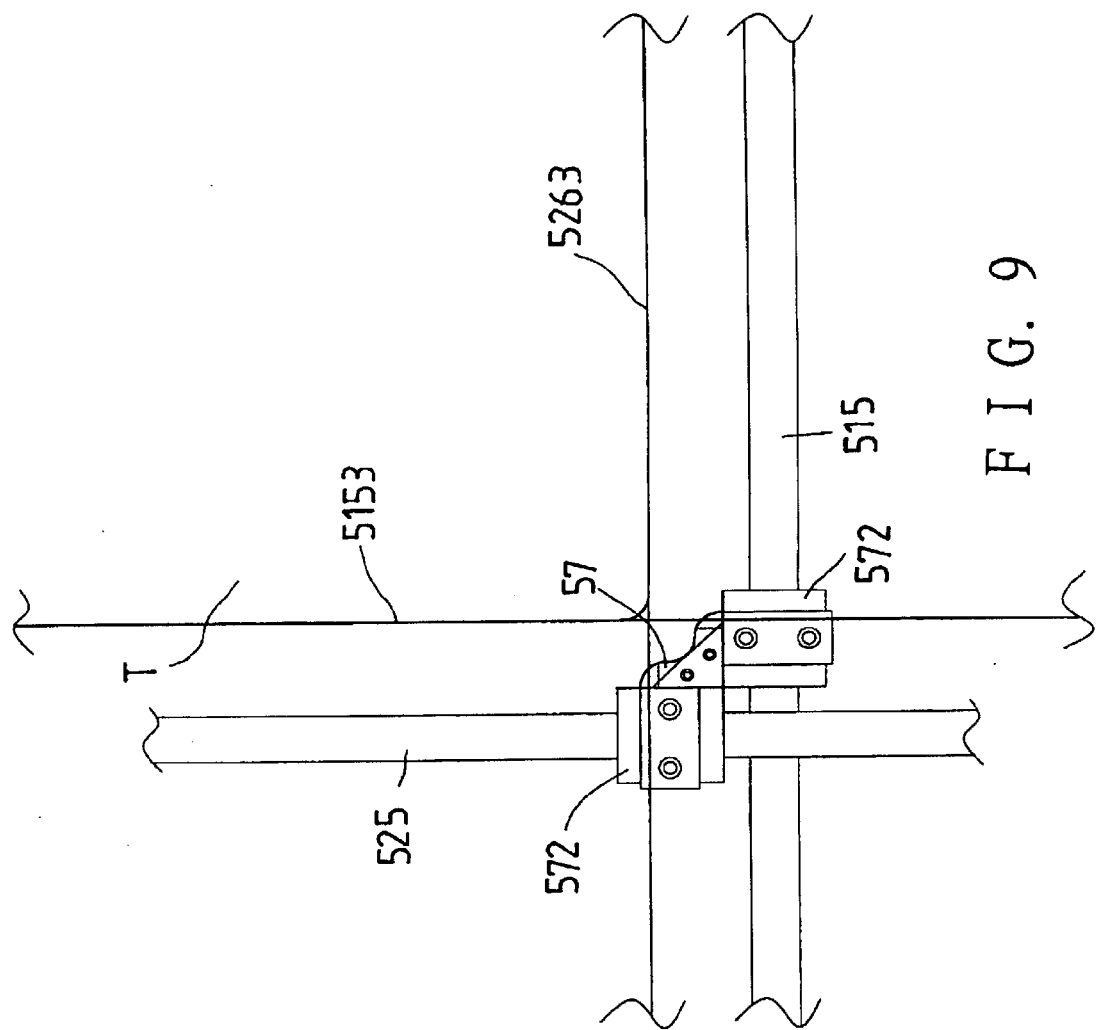
FIG. 9 is an upper view of the position block of the present invention.

Further, four position blocks 57 are fixed at four corners of the crossing position rods 515, 516, 525, 526, having the same structure of an L shape, as shown in FIGS. 7, 8 and 9, and a support plate 571 is connected with an upper surface and a bottom surface. Each support plate 571 has a linear bearing 572 fixers on the bottom surface for engaging a corresponding one of the position rods 515, 516, 525, 526. Each linear bearing 572 is securely coupled to a position rod 515, 516. Then each position block 57 moves nearer to the center of the machine body or further away when each position rod moves. Each position block 57 is grooves 573, 574 in upper and lower sides of two ends for the tungsten filaments 5153, 5163, 5253, 5263 to pass through.

Figure 10:
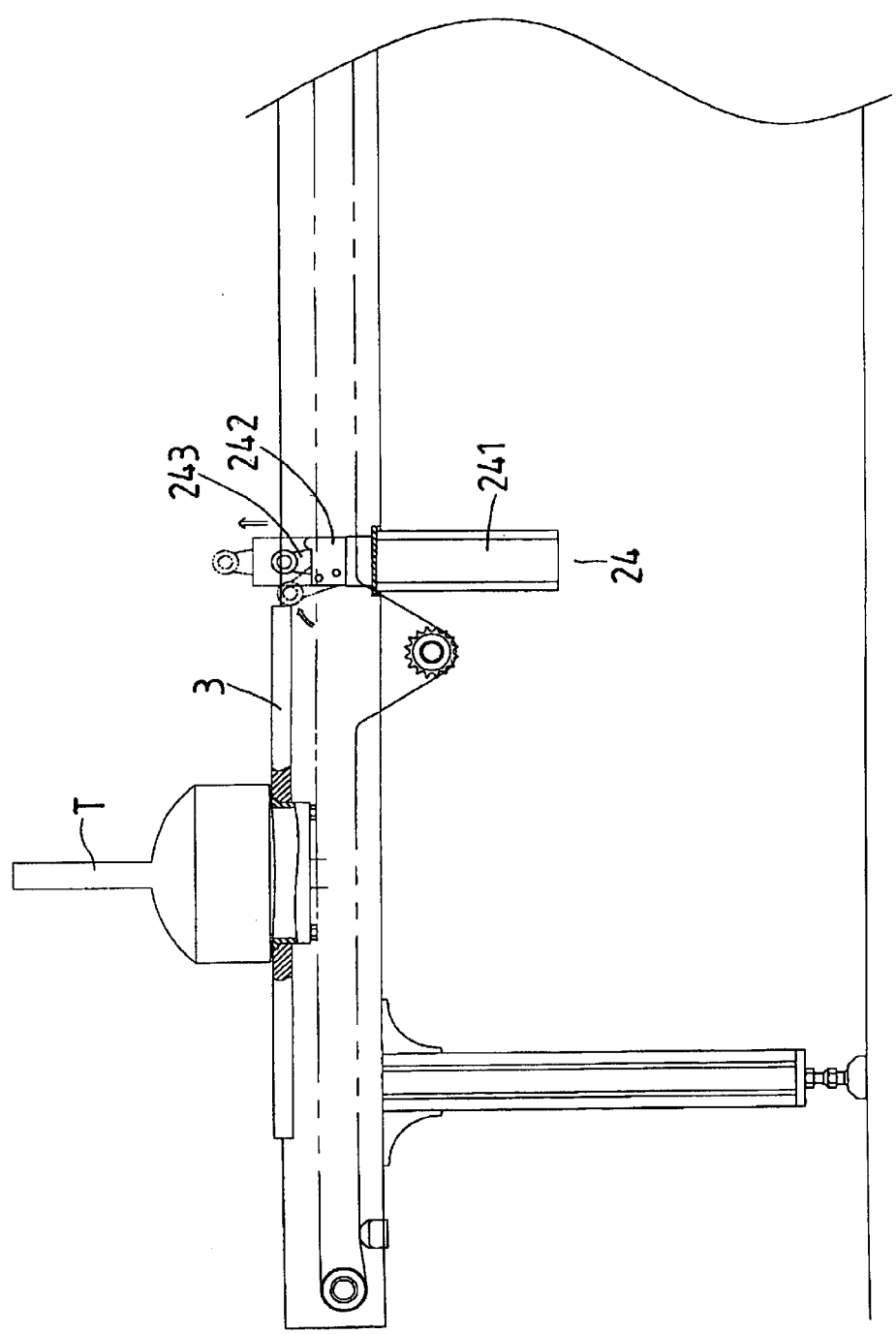
FIG. 10 is a side view of an: operation of the automatic picture tube cutting machine, showing the transporting tray stopped by a first stop plate.
Figure 11:
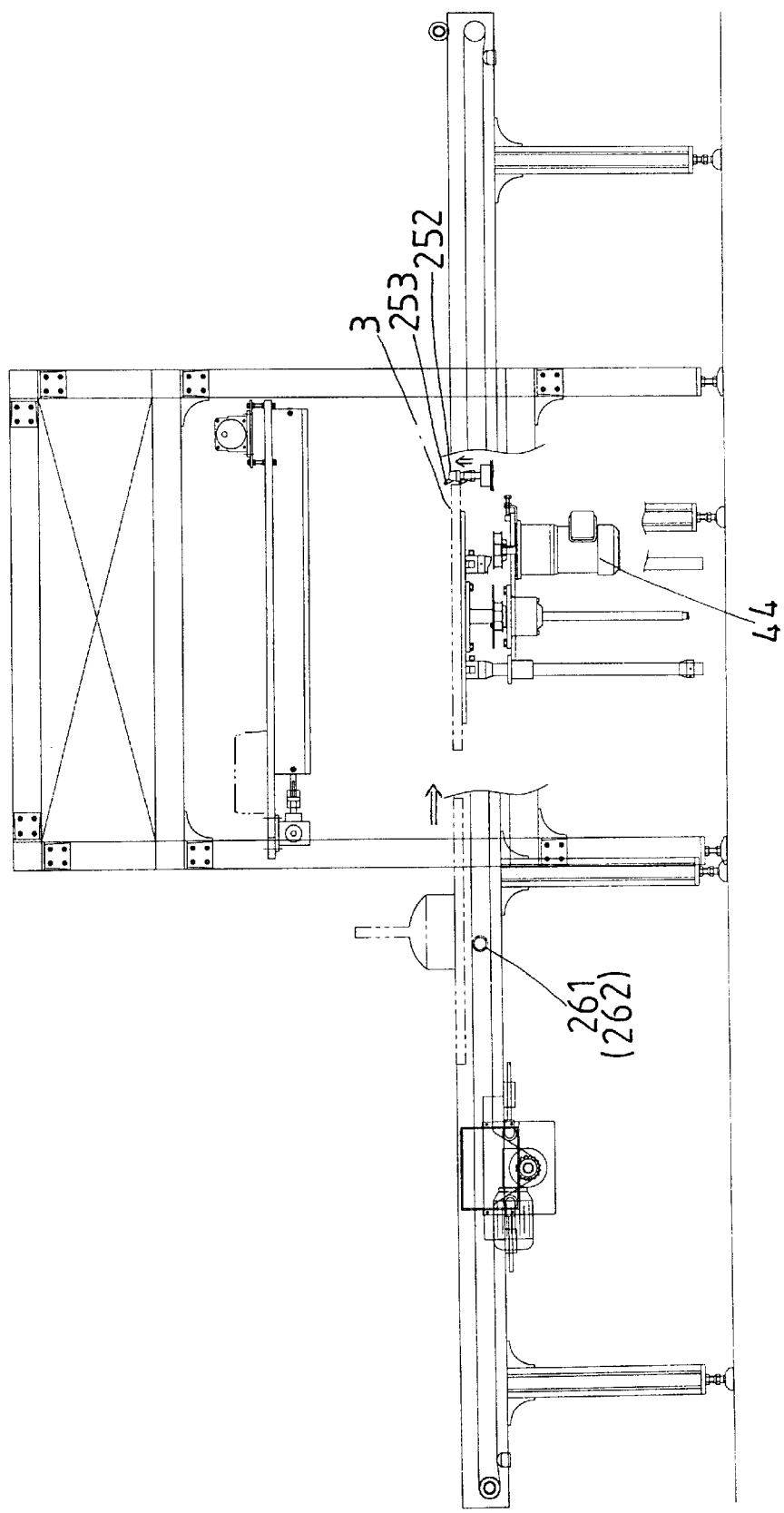
FIG. 11 is a front view of an operation of the automatic picture tube cutting machine, showing the transporting tray moving in the moving-up-and-down base.

In cutting a picture tube, first, a picture tube T is placed on the transporting tray 3, which is then moved forward by the transporting machine 2. When the front side of the transporting tray 3 touches the micro switch 243 of the first stop unit 24 of the transporting machine 2, the air pressure cylinder 241 moves its piston rod and subsequently the stop block 242 extends upward to stop the transporting tray 3, as shown in FIG. 10, waiting for command from the controller. When the controller notifies that a material has arrived, the stop block 242 moves down to let the transporting tray 3 move forward to enter the moving-up-and-down base 4. Then when a second transporting tray 3 behind the first one touches the micro switch 243, the stop block 242 of the first stop unit 24 at once rises to stop the second transporting tray 3 to let it wait.

The transporting tray 3 touches the speed recorder 26 below the transporting machine 2 before the transporting tray 3 enters the moving-up-and down base 4, and the speed recorder 26 sends out the distance signal to pass over. When the transporting tray 3 enters the moving-up-and-down base 4 and the front side of the picture tube on the base 4 touches the photoelectric switches 261, 262, the PLC controller of the controller 13 and the coder begin to record data sent from the speed recorder 26 until the picture tube totally passes through the photoelectric switches 261, 262, calculating accurately the size of the picture tube depending on the distance signal sent by the speed recorder 26 so that the controller 13 may decide the parameters needed for cutting (such as the height, the heating current, heating time and frequency of spraying).

Figure 12:
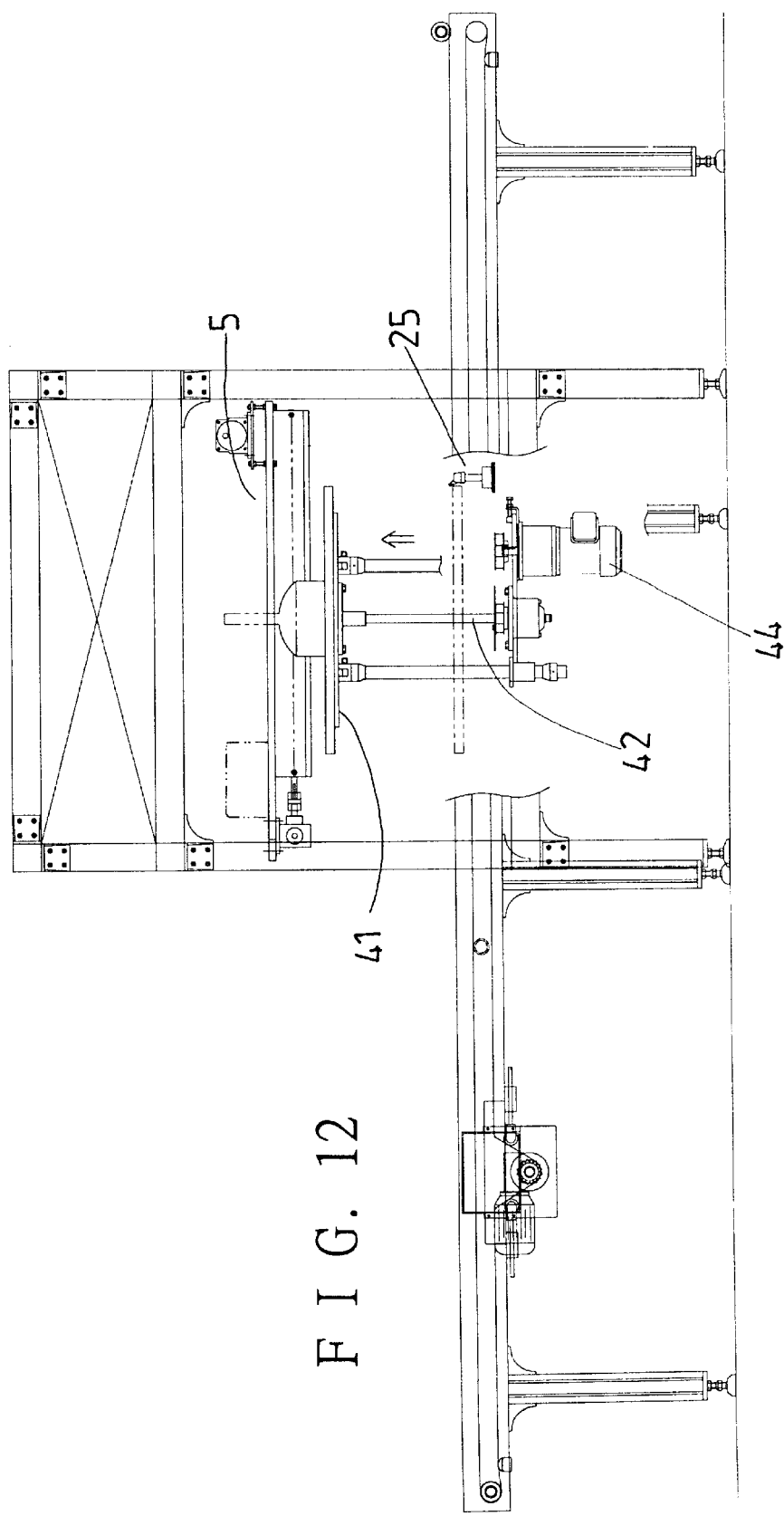
FIG. 12 is a front view of an operation of the automatic picture tube cutting machine, showing the moving-up-and-down base lifted up.

When the picture tube on the transporting tray 3 enters the moving-up-and-down base 4, the transporting tray 3 touches the micro switch 253 of second stop plate unit 25 to activate the air pressure, cylinder 251 to move up the stop block 252 to stop the transporting tray 3. Subsequently the power source 44 of the moving-up-and-down base 4 starts to rotate the bead threaded rod 42 to lift quickly the moving-up-and down plate 41 according to the parameter of the height to be lifted, as shown in FIG. 12. When the bead threaded rod 42 rotates, the rotating disc 425 is rotated to accurately position the height of the picture tube with cooperation of the magnetic sensor 427 sensing passing condition of the through holes 426 of the rotating-disc 425 and calculate the height to be lifted. As the moving-up-and-down base 4 begins to rise up, the position rods 515, 516, 525, 526 of the inner and the outer clamp units 51, 52 of the positioning and cutting device 5 and the heating tungsten filaments 5153, 5163, 5253, 5263 move forward to the set position in advance to reduce work time.

Figure 13:
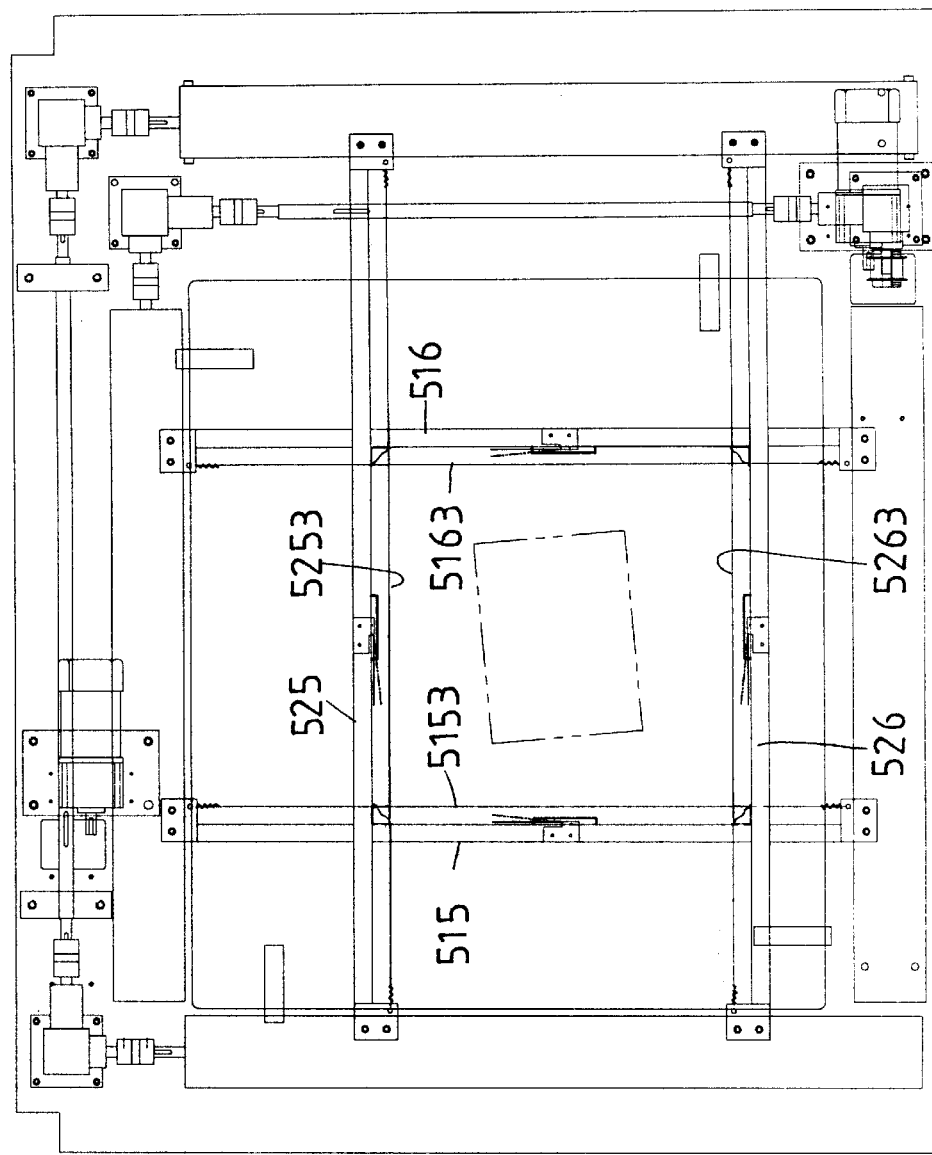
FIG. 13 is an upper view of an operation of the automatic picture tube cutting machine, showing the positioning and cutting device making adjustment.
Figure 14:
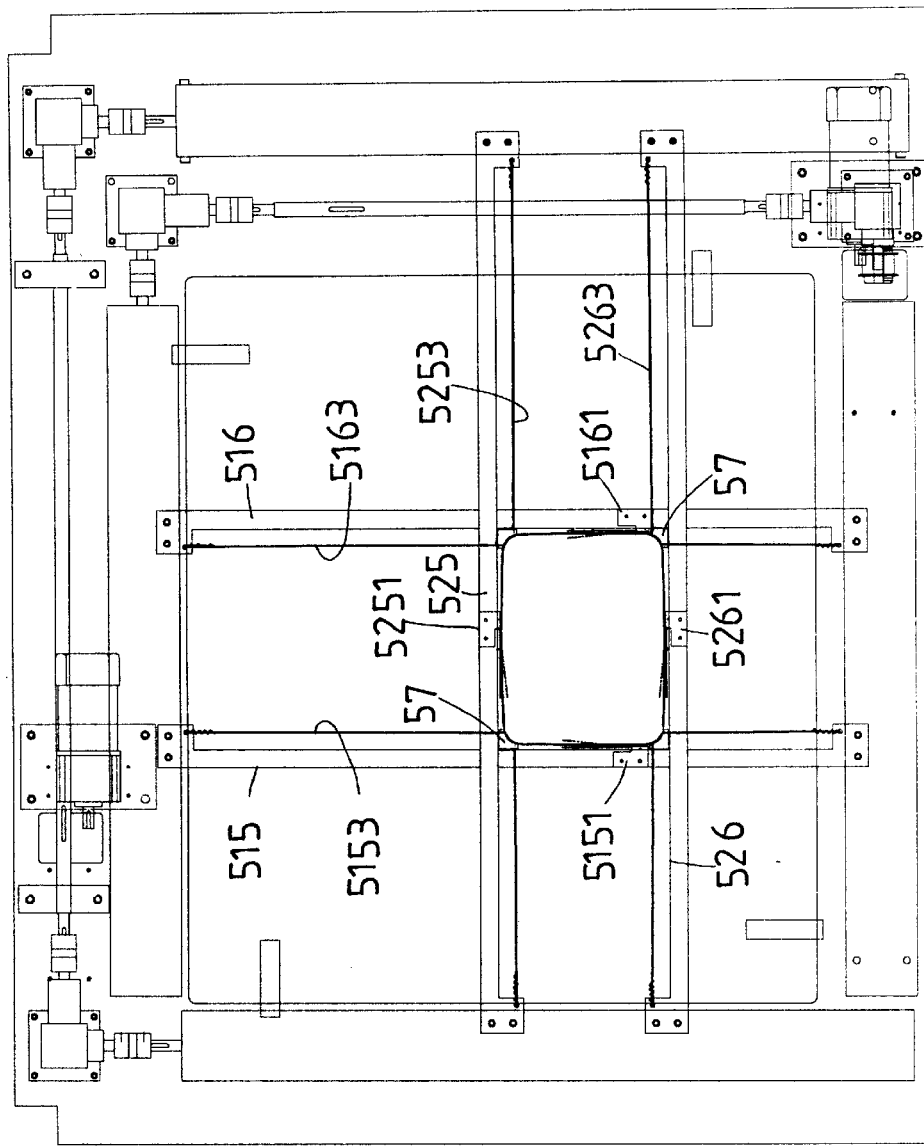
FIG. 14 is an upper view of an operation of the automatic picture tube cutting machine, showing the positioning and cutting device clamping and positioning a picture tube.

After the moving-up-and-down base 4 lifts the transporting tray 3 with the picture tube to the preset height for cutting, the power sources 53, 55 of the inner and the outer clamp units 51, 52 operate to rotate the threaded rods 513, 514, 523, 524 at four sides to move the position rods 515, 516, 525, 526 as shown in FIG. 13 toward the center of the picture tube. Should the picture tube be not positioned correctly to bias to any side during placing the picture tube on the transporting tray 3 or transporting process, the position rods may touch the end not correctly positioned to move the picture tube to the other side because of the springs of the heating tungsten filaments until the position rod at the other side touches the picture tube. In other words, when the micro switches 5151, 5161, 5251, 5261 of the positions rods 515, 516, 525, 526 all touch the picture tube, as shown in FIG. 14, that means the picture tube is positioned in the center and stopped.

Figure 15:
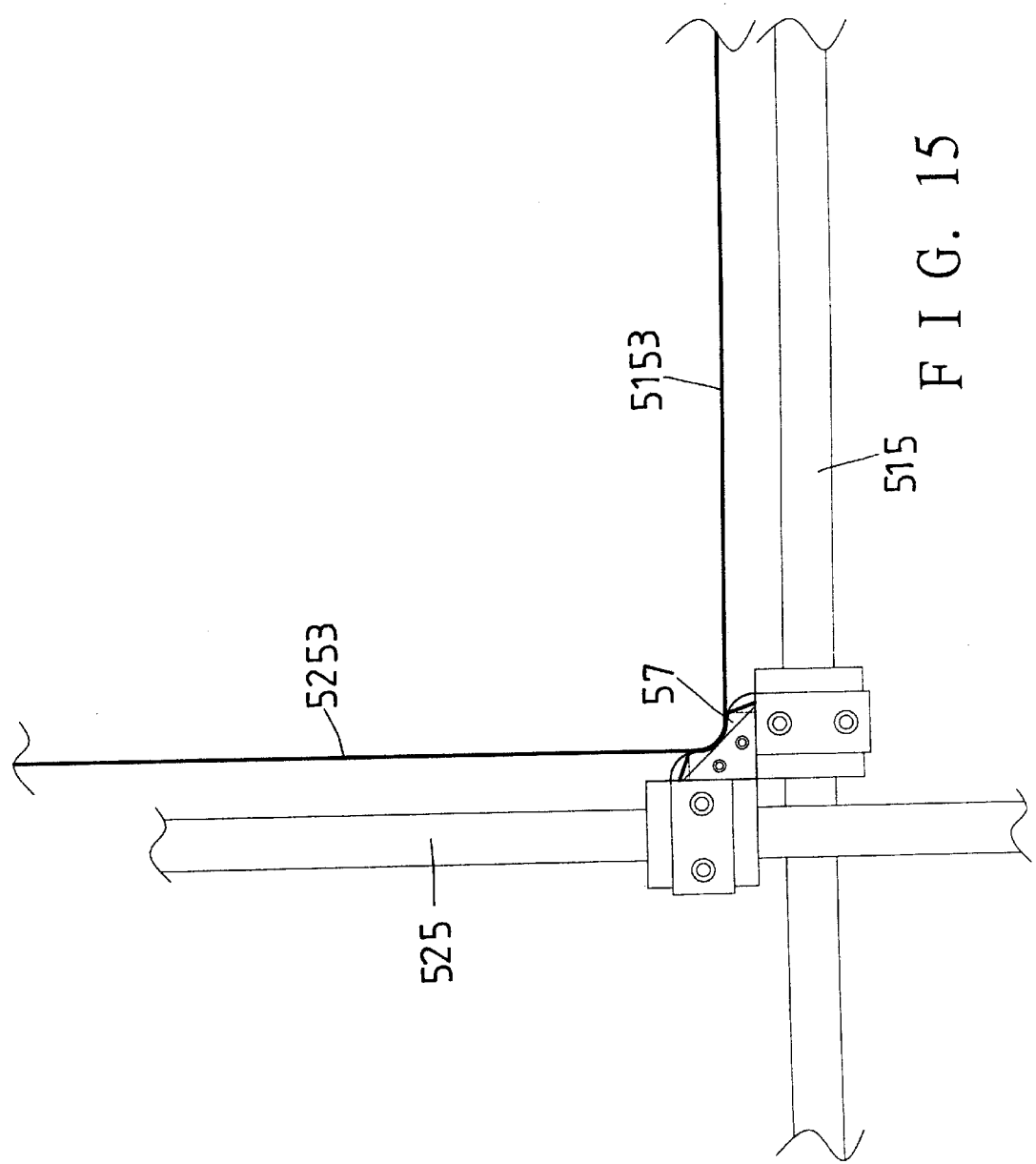
FIG. 15 is an upper view of an operation of the automatic picture tube cutting machine, showing a position block positioning a corner of the picture tube.
Figure 16:
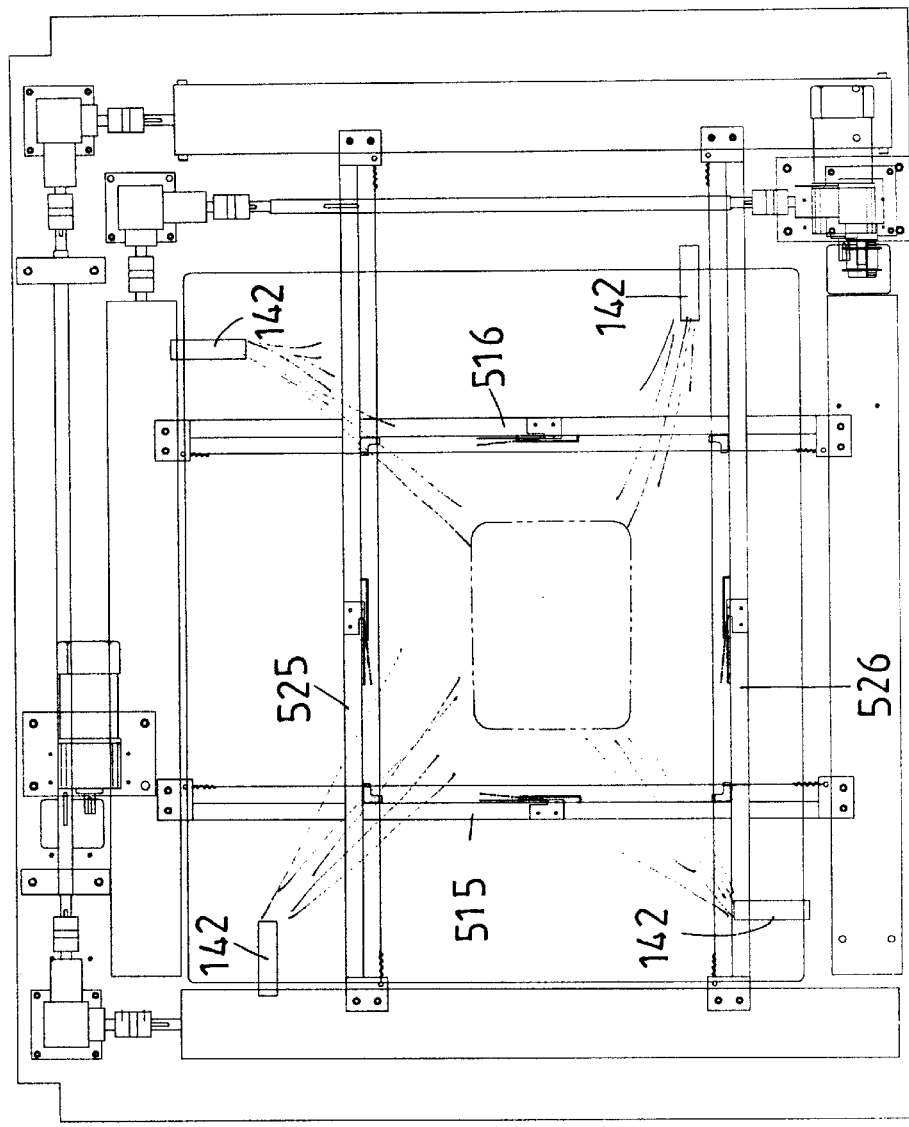
FIG. 16 is an upper view of an operation of the automatic picture tube cutting machine, showing nozzles spraying water.

When the position rods 515, 516, 525, 526 adjust the picture tube to the center, the heating tungsten filaments 5153, 5163, 5253, 5263 are extensible and shrinkable and the picture tube is circular at four sides, the heating tungsten filaments may closely contact the four sides of the picture tube, with the position blocks 57 of the position rods 515, 516, 525, 526 tightly contacting the four corners of the picture tube, as shown in FIG. 15. Then current can be turned on into the heating tungsten filaments for a preset period of time and then cut off, and the position rods 515, 516, 525, 526 together with the tungsten filaments 5153, 5163, 5253, 5263 are all retreated outward. Then the nozzles 142 spray cool water as shown in FIG. 16, letting the glass of the picture tube swiftly cool down to break at the heated position, and the front stage glass is cut off the rear stage glass of the picture tube. After that, the moving-up-and-down base 4 brings the cut picture tube down on the transporting machine 2 to be transported out and begin next process of material separation and sucking off luminescent powder. When the first transporting tray 3 is sent out, the second transporting tray 3 waiting will enter the moving-up-and-down base 4 for next cutting process.

Figure 17:
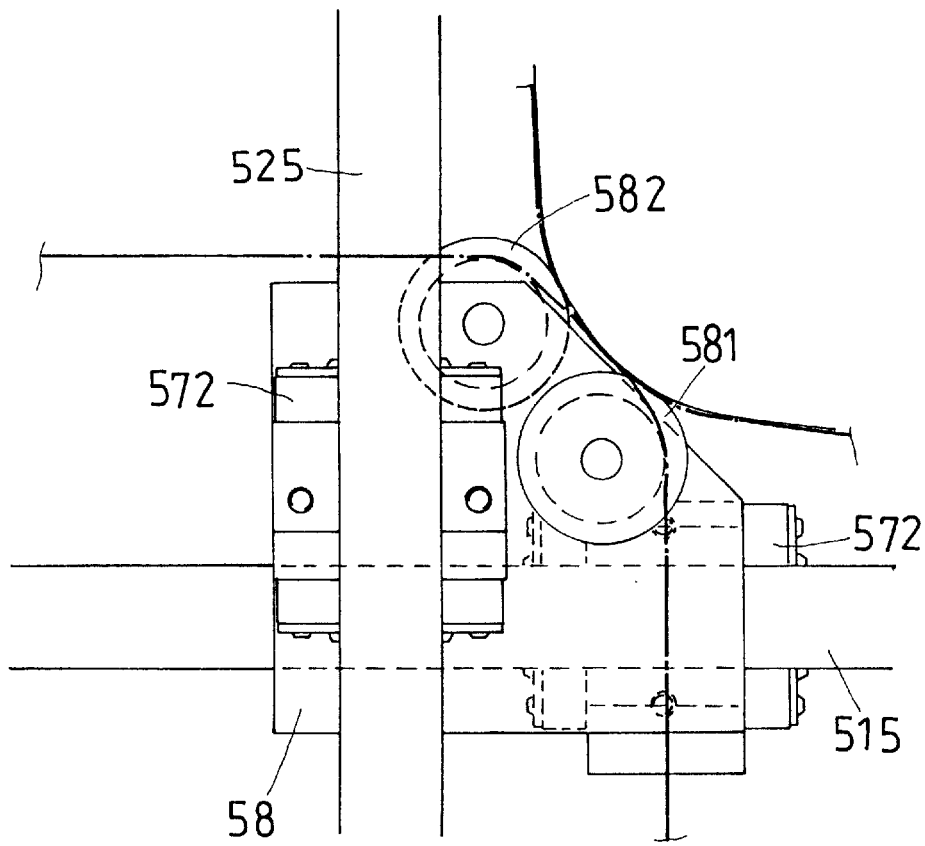
FIG. 17 is an upper view of another embodiment of a linear bearing on a position rod of the present invention.
Figure 18:
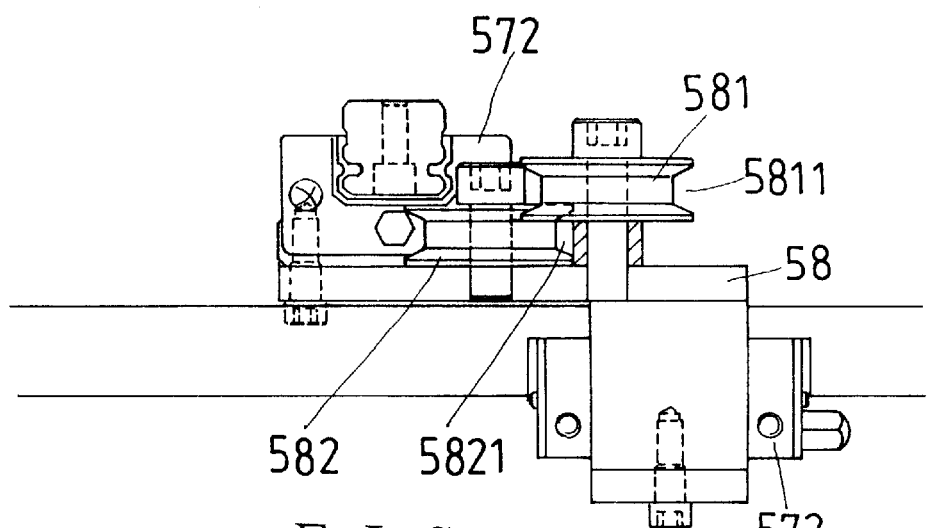
FIG. 18 is a side view of FIG. 17.

Further, as shown in FIGS. 17, 18, a fix plate 58 is fixed on each linear bearing 572 respectively located at four crossing corners of the position rods 515, 516, 525, 526, and a high roller 581 and a lower roller 582 are combined on the fix plate 58, having an annular groove 5811, 5821 for the tungsten filaments 515, 516, 525, 526 to fit in. When the picture tube is adjusted to the center, the rollers 581, 582 rest against the four corners of the picture tube to let the tungsten filaments closely contact the four corners of the picture tube.

As can be understood from the aforesaid description, the automatic picture tube cutting machine in the invention has the following advantages.

1. This machine accurately calculates the size of a picture tube passing through with the speed recorder and the photoelectric switches and operation of the coder and the PLC controller, and then decides the time needed for heating, heating temperature, the best height for cutting by making use of various data got from the components.
2. The position rods of the positioning and cutting device move a picture tube, and with help of the position blocks of the position rods, permitting the extensible and shrinkable tungsten filaments to closely contact the four sides of the picture tube, which is adjusted correctly in the center for cutting.
3. The recessed frame of the transporting tray can not only keep a picture tube placed therein not liable to slide out of the transporting tray, but the circumferential edge of the recessed frame contact the screen of a picture tube by means of linear contact, so even a light force can move the picture tube easily to adjust its position.
4. The heating tungsten filaments are connected with springs at two ends so as to have extensible and shrinkable capacity to be adapted to various sizes of picture tubes to stabilize the current passing therethrough.

What is claimed is:

1. An automatic picture tube cutting system comprising:
   (a) a frame;
   (b) a transporting unit coupled to a lower portion of the frame, said transporting unit including a transporting tray for supporting a picture tube, said transporting unit being operable to transport the picture tube;
   (c) a moving-up-and-down base coupled to said frame, said moving-up-and-down base being operable to vertically adjust in position a picture tube received from said transporting unit; and,
   (d) a positioning and cutting device coupled to said frame, said positioning and cutting device including:
      (1) first and second pairs of rotatable threaded rods, said first pair of threaded rods being interlinked for mutually responsive rotation, said second pair of threaded rods being interlinked for mutually responsive rotation, each of said threaded rods having a pair of opposed end sections threaded in a complementary manner;
      (2) a plurality of guide blocks, each threadedly engaging one said end section of one said threaded rod;
      (3) a plurality of position rods each extending between a pair of said guide blocks to collectively define a rectangularly crossed configuration;
      (4) a plurality of micro switches each coupled to an intermediate portion of a respective one of said position rods; and,
      (5) a plurality of heating filaments each extending in resilient manner substantially between a pair of said guide blocks to be disposed within said rectangularly crossed configuration defined by said position rods, said filaments being operable to substantially circumscribe and heat a portion of the picture tube to be cut.

2. The automatic picture tube cutting system as recited in claim 1 wherein said positioning and cutting device includes a plurality of cross turners, a first pair of said cross turners respectively engaging said first pair of threaded rods, a second pair of said cross turners respectively engaging said second pair of threaded rods, each said first and second pair of cross turners being linked by a connect rod extending therebetween.

3. The automatic picture tube cuffing system as recited in claim 2 wherein at least one said connect rod has coupled thereto a timing belt wheel for belt drive by a power source.

4. The automatic picture tube cutting system as recited in claim 2 wherein at least one said connect rod has coupled thereto a timing belt wheel connected by a timing belt to position means for regulating relative positions of said position rods.

5. The automatic picture tube cutting system as recited in claim 1 wherein each said heating filament is coupled to one said guide block at each opposed end thereof by a spring.

6. The automatic picture tube cutting system as recited in claim 5 wherein said positioning and cutting device includes a plurality of substantially L-shaped position blocks, each said position block being disposed at an intersection of said position rods, each said position block having a support plate and a linear bearing projecting transversely therefrom, said support plate and linear bearing slidably engaging respective ones of an intersecting pair of said position rods.

7. The automatic picture tube cutting system as recited in claim 6 wherein each said position block has formed respectively at offset upper and lower portions thereof a pair of grooves each passing one said heating filament therethrough.

* * * * *